United States Patent Office 2,944,238
Patented July 5, 1960

2,944,238

RESOLVERS FOR PRODUCING ELECTRICAL SIGNALS REPRESENTATIVE OF THE COMPONENTS IN COORDINATE DIRECTIONS OF A MECHANICAL MOVEMENT

Arthur Alec Cecil Barnett, Kennett Charles Warner, and Philip Neville George Knowles, all of London, England, assignors to The Decca Record Company Limited, London, England, a British company Filed May 18, 1959, Ser. No. 814,003

14 Claims. (Cl. 338—131)

This invention relates to resolvers for producing electrical signals representative of the components in co-ordinate directions of a mechanical movement. Such resolvers are required particularly for controlling the position of an electronic marker on a radar display screen. In controlling such a marker, it is necessary to be able to position the marker very accurately whilst still being able to move the marker very quickly from one position on the screen to another. The marker on a cathode ray tube is inherently controlled by electrical signals and hence, although it is desirable that the resolver should produce signals accurately representative of the components of the mechanical movement, any slight inaccuracy does not effect the utility of the resolver; since the position of a manual control member is immaterial; the operator observes the display screen and merely moves the manual control member so that the requisite electrical signals are produced to position the marker appropriately on the screen. Heretofore, it has been the practice to use a manual control member which is movable in two co-ordinate directions and which is mechanically coupled to two potentiometers and, in order to enable the marker to be controlled very accurately and yet be moved rapidly across the screen, the coupling system has incorporated gearing so that two different speed ratios between the mechanical movement of the control member and the consequent movement of the potentiometer arms are possible.

It is an object of the present invention to provide an improved form of resolver particularly for controlling the position of a marker on a radar display screen.

According to this invention, a resolver for producing electrical signals representative of the components in two co-ordinate directions of a mechanical movement comprises a freely mounted ball, at least two wheels frictionally engaging the surface of the ball at different points thereon and potentiometers driven by said wheels. The ball may be moved freely and can, if necessary, be spun to enable large movements of the potentiometers to be effected yet it enables accurate control of the potentiometers to be obtained. The potentiometers may be driven from the wheels through reduction gearing so that the ball may be turned through several revolutions to move the potentiometers between their limits.

Conveniently the ball has a diameter greater than the diameter of said wheels; the reduction gearing in the drive between the wheels and the potentiometers may still be arranged so that relatively large angular movements of the ball are necessary to effect the required movements of the potentiometers.

Preferably the ball is made relatively heavy so as to have a high moment of inertia and the ball may be made of a relatively dense plastic material such as, for example, material similar to that employed in billiard balls. The wheels may also have attached thereto or incorporate weights forming flywheels so as to give a high moment of inertia to the drive systems. Such inertia facilitates the rapid movement of the potentiometers by spinning the ball.

Normally only signals representative of two components of the motion are required and for this purpose conveniently the two wheels are arranged with their axes in a diametral plane of the ball engaging the ball respectively at points on the end of orthogonal diameters in that plane. Conveniently the axes of the two wheels are at right angles to one another, each being parallel to the tangent to the ball at the point of contact of its associated wheel. With such an arrangement having two wheels for driving potentiometers, a third idler wheel may be provided in the aforementioned diametral plane. Preferably this plane is arranged to be horizontal and the ball is supported on the wheel of a castor capable of swinging about an axis extending in the direction of the diameter of the ball normal to said diametral plane. It is found that such a castor permits the ball to be freely supported yet it can be turned rapidly about any diameter. In one form of construction the castor is mounted above a flat base plate and a second plate is rigidly secured to this base plate above and parallel to it, this second plate having an aperture through which part of the surface of the ball protrudes to enable an operator to rotate the ball. The friction wheels then are conveniently arranged to make contact with the ball in a diametrical plane parallel to said plates.

The aforementioned wheels frictionally engaging the surface of the ball and preferably also the aforementioned idler wheel and the castor may be formed of resilient material, conveniently nylon. The outer surfaces of the wheels when they contact the ball are preferably made relatively thin in their axial direction and it has been found desirable, in order to ensure accurate correspondence between the movement of the potentiometer and the movement of the ball in the appropriate directions, to form a series of tracks consisting of very fine grooves extending around the peripheral contact surface of each wheel. It will be appreciated that, although this arrangement can be made to give very little slip between the ball and the wheels, such slip is, in fact, immaterial when the resolver is used for controlling the position of an electronic marker on a radar display screen.

The following is a description of one embodiment of the invention, reference being made to the accompanying drawings in which.

Figure 1:
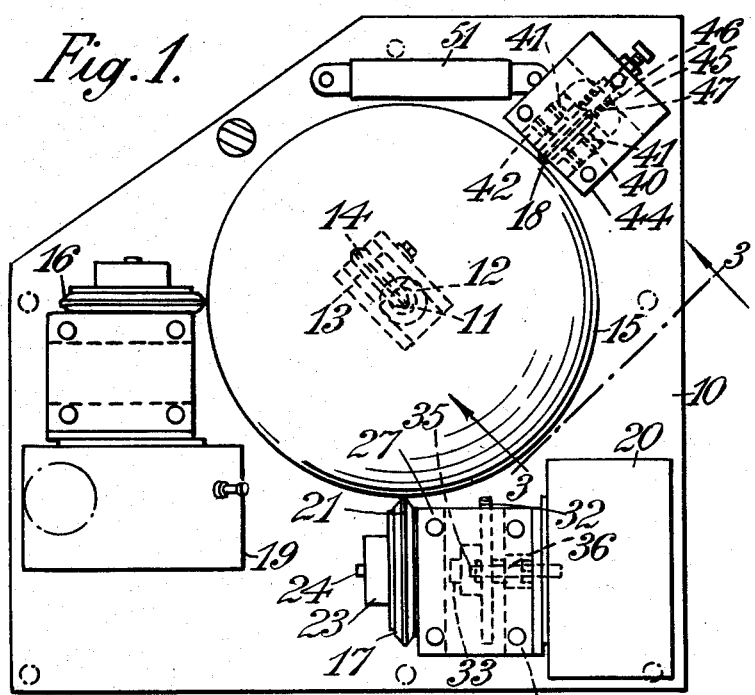
Figure 1 is a plan view of a resolver for producing electrical signals representative of the components in co-ordinate directions of a mechanical movement, the top cover plate being removed to show the internal construction.
Figure 2:
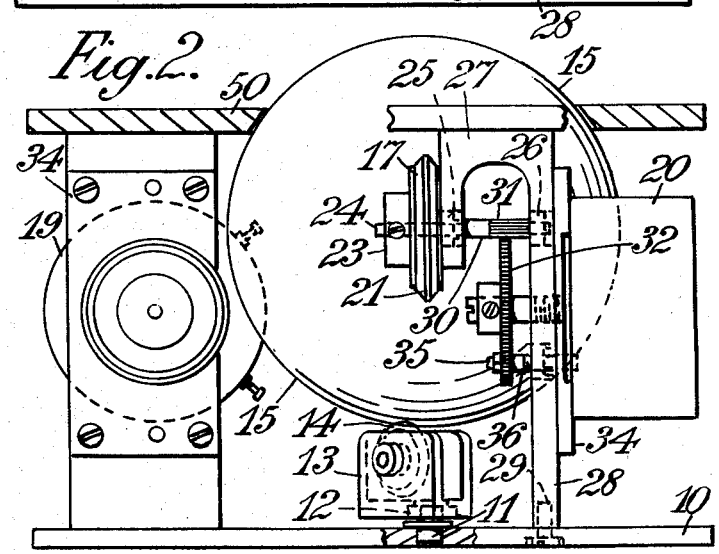
Figure 2 is a side elevation partly in section of the resolver of Figure 1.

Referring to the drawings, the resolver illustrated has a base plate 10, which in the following description will be assumed to be horizontal. On this base plate is mounted a pivot pin 11 on which, by means of ball bearings 12, a castor assembly 13 is rotatable, which castor assembly has an idler wheel 14. The axis of the wheel 14 is horizontal and is offset to one side of the axis of the pivot pin 11. The wheel 14 is conveniently formed of nylon. A spherical ball 15 formed of relatively dense plastic material, similar to that employed in billiard balls, is located above the castor assembly 13 resting on the wheel 14, the centre of the ball being exactly positioned on the axis of the pivot pin 11. The ball 15 is held in this position by means of three wheels 16, 17, 18 which have their axes horizontal and which bear against the surface of the ball 15 at points in a horizontal diametral plane, the axes of the three wheels 16 to 18 being parallel to the tangents to the surface of the ball 15 and points of contact therewith. The two wheels 16, 17 are friction wheels for driving potentiometers 19, 20 respectively and these two wheels 16, 17 are positioned to engage the ball 15 at the ends of orthogonal diameters. Each of the wheels 15, 16 is formed of nylon and each wheel has a flat peripheral portion 21 for bearing against the surface of the ball 15. This peripheral portion is formed with a series of tracks consisting of very fine grooves extending around the peripheral contact surface 21 of each wheel. In a typical case, a wheel for engaging a ball of four inches diameter might have the flat portion 21 1/32 of an inch wide and the grooves might be spaced seven thousandths of an inch apart. The wheels 16, 17 are each secured to a metal boss 23 carried on a shaft 24 journaled in ball bearings 25, 26, the bearings 25, 26 being housed respectively in the two arms of an inverted U-shaped member 27 having a longer arm 28 which is bolted by bolts 29 to the base plate 10. The shaft 23 is formed with an enlarged diameter portion 30 having a shoulder bearing against the shorter arm of the U-shaped member 27 to eliminate thrust play in one direction and having gear teeth 31 on the shaft which bear against the other arm to eliminate play in the opposite direction and form a pinion engaging with a gear wheel 32 secured to the rotatable drive shaft 33 of the aforementioned potentiometer 19 (or 20) which potentiometer is secured to a plate 34 on the longer arm 28 of the member 27. The pinion 31 and gear wheel 32 in the example shown in the drawings provide a 10:1 reduction ratio so that, although the ball 15 is of larger diameter than the wheels 16, 17, several revolutions of the ball are necessary to rotate either of the potentiometers between its limits. The angular rotation of each of the potentiometers is limited by a stop comprising a bolt 35 secured in the gear wheel 32, which bolt abuts against a bolt 36 on the arm 28.

Figure 3:
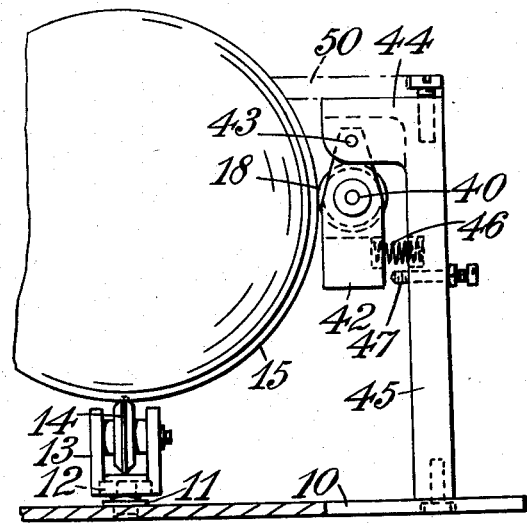
Figure 3 is a sectional view along the line 3—3 of Figure 1.

The aforementioned wheel 18 is an idler wheel and conveniently is a nylon wheel similar to the castor wheel 15. As shown in Figure 3 the wheel 18 which preferably has peripheral grooves similar to those on the wheels 16, 17, is carried on a shaft 40 in ball bearings 41 in a U-shaped member 42 pivotally mounted at 43 between two arms of a support member 44 formed integrally with an upright frame member 45 bolted to the aforementioned base plate 10. The pivot axis for the U-shaped member 42 and the axis of the wheel 18 are horizontal and the U-shaped member 42 is urged by a spring 46 in a direction to keep the wheel 18 in engagement with the ball 15 in its horizontal diametral plane. An adjustable stop 47 is provided to limit movement of the wheel 18 away from the ball 15.

A top plate 50 is secured on the aforementioned members 27 and 45 and is arranged exactly parallel to the base plate 10. This top plate has an aperture through which the ball 15 protrudes to enable an operator to rotate the ball.

The potentiometers 19, 20 are connected by leads, not shown, to a tag board 51 on the base plate 10.

It will be seen that the ball 15 can be moved freely and can, if necessary, be spun to enable large movements of the potentiometers 19, 20 to be effected quickly, yet it enables accurate control of the potentiometers to be obtained. One or other or both of the potentiometers will rotate according to the direction in which the ball is moved and the amounts of rotation of the potentiometers will be proportional to the components of the rotation of the ball.

It has been found that with a ball of the material described above, the inertia of the ball is sufficient to obtain rapid movement of the potentiometers by spinning the ball. The effective inertia may be increased, however, if desired by attaching weights to the wheels 16, 17 or may be provided with fly-wheels. If separate fly-wheels are provided, these are preferably secured to the friction wheel shafts by resilient coupling, for example each may be freely mounted for rotation on its shaft but secured by a spring to limit rotation relative to the shaft. Such resilient mounting facilitates the rapid acceleration of the ball when it is required to move the marker quickly whilst the inertia of the ball and fly-wheels helps to keep the continued movement of the potentiometer as the ball spins.

In an arrangement employing a castor as described above, the castor swings about its pivot axis to take up a direction dependent on the last direction of movement of the ball. It will be appreciated that the point of contact of the castor wheel with the ball must be off-set a definite distance from the axis of rotation of the castor; this distance however can be made very small so that only a little movement of the ball in one direction is necessary before the castor is aligned with that direction. If it is required to know this direction of movement, for example if the resolver is used to produce signals for following an echo on a radar display screen and it is required to know the direction of movement of the marker, this direction of movement can be determined from the position of the castor. For example the castor may be coupled to a potentiometer drive shaft so that a signal is produced representative of the angular position of the castor.

If it is required to know the position of the marker on the display screen with respect to a datum such as the centre of the screen, the two wheels for driving orthogonally arranged potentiometers may also be arranged each to drive a pinion engaging a rack for moving transversely a straight rod or bar member extending in a direction parallel to the axis of the wheel the members extending at right angles to their direction of movement so that the position of the point of intersection of these two members with respect to a datum on the assembly gives the required direction.

Instead of or in addition to employing mechanical gearing for driving the potentiometers for the aforementioned wheels, it is possible to use two wheels on opposite ends of the diameter of the ball, the wheels being of slightly different diameter or driving potentiometers through different gear ratios and, if the drive ratios of the two potentiometers are nearly but not quite equal, the difference of the outputs of the potentiometers would give a signal which only changes slowly with large movements of the ball.

We claim:

1. A resolver for producing electrical signals representative of the components in two co-ordinate directions of a mechanical movement comprising a freely mounted ball, at least two wheels frictionally engaging the surface of the ball at different points thereon and potentiometers driven by said wheels.

2. A resolver as claimed in claim 1 wherein the potentiometers are driven from the wheels through reduction gearing so that the ball may be turned through several revolutions to move the potentiometers between their limits.

3. A resolver as claimed in claim 2 wherein the ball has a diameter greater than the diameter of said wheels.

4. A resolver for producing electrical signals representative of the components in two co-ordinate directions of a mechanical movement, comprising a support, a ball freely mounted in said support, two wheels rotatably mounted in said support with their axes in a diametral plane of the ball annd frictionally engaging the surface of the ball at points respectively on the ends of orthogonal diameters of the ball in that plane, and two potentiometers driven respectively by said wheels.

5. A resolver as claimed in claim 4 wherein the axes of the two wheels are at right angles to one another, each being parallel to the tangent to the ball at the point of contact of its associated wheel.

6. A resolver as claimed in claim 4 having two wheels for driving potentiometers, wherein a third idler wheel is provided in said diametral plane.

7. A resolver as claimed in claim 1 wherein said wheels frictionally engaging the surface of the ball are formed of resilient material.

8. A resolver as claimed in claim 1 wherein said wheels frictionally engaging the surface of the ball are formed with a series of tracks consisting of very fine grooves extending around the peripheral contact surface of each wheel.

9. A resolver as claimed in claim 7 wherein said resilient material is nylon.

10. A resolver for producing electrical signals representative of the components in two co-ordinate directions of a mechanical movement, comprising a support, a ball, a castor rotatably carried on said support having a wheel on which said ball rests with a diametral axis of the ball coincident with the axis of rotation of the castor, two wheels rotatably mounted in said support with their axes in a diametral plane of the ball normal to said diametral axis, said two wheels frictionally engaging the surface of the ball at points respectively on the ends of orthogonal diameters of the ball in said diametral plane, and two potentiometers driven respectively by said two wheels.

11. A resolver as claimed in claim 10 wherein a further idler wheel is provided engaging the surface of the ball in said diametral plane.

12. A resolver for producing electrical signals representative of the components in two directions of a mechanical movement, comprising a support, a ball, a castor rotatably carried on said support having a wheel of smaller diameter than said ball, said ball resting on said wheel with a diametral axis of the ball coincident with the axis of rotation of the castor but having the point of contact of the ball and castor wheel off-set from said axis, two friction wheels rotatably mounted in said support with their axes in a diametral plane of the ball normal to said diametral axis, said two wheels having diameters smaller than the diameter of said ball and frictionally engaging the surface of the ball at points respectively on the ends of orthogonal diameters of the ball in said diametral plane, two potentiometers driven respectively from said two friction wheels, and at least one idler which engages the surface of the ball, in said diametral plane, said castor wheel, friction wheels and idler wheel forming the sole support for said ball so that the ball is freely rotatable in any direction.

13. A resolver as claimed in claim 12 wherein said idler wheel is rotatably mounted in said support to engage the ball in said diametral plane within the smaller arc between the ends of said orthogonal diameters opposite to the ends engaged by said friction wheels.

14. A resolver as claimed in claim 12 wherein each of said friction wheels is formed of resilient material and has a series of tracks consisting of very fine grooves extending around the peripheral contact surface of each wheel.

References Cited in the file of this patent
UNITED STATES PATENTS
2,858,980    Bargmann _____ Nov. 4, 1958